United States Patent [19]

Niimi et al.

[11] 3,948,431
[45] Apr. 6, 1976

[54] MANUFACTURING METHOD OF METALLIC HONEYCOMB STRUCTURES

[75] Inventors: Itaru Niimi, Nagoya; Yasuhisa Kaneko, Toyota; Yoshiro Komiyama, Okazaki; Masaoki Hashimoto, Toyota; Hitoshi Ogawa, Kariya, all of Japan

[73] Assignees: Toyota Jidosha Kogyo Kabushiki Kaisha, Toyota; Aisin Seiki Kabushiki Kaisha, Kariya, both of Japan

[22] Filed: Aug. 16, 1974

[21] Appl. No.: 497,934

[30] Foreign Application Priority Data
Sept. 6, 1973 Japan............................ 48-100525

[52] U.S. Cl. ................. 228/173; 228/181; 228/245
[51] Int. Cl.² ........................................ B23K 1/04
[58] Field of Search .......... 29/471.1, 494, 500, 501; 228/181, 246, 245, 173

[56] References Cited
UNITED STATES PATENTS

| 858,258 | 6/1907 | Briscoe et al. ............... 29/500 X |
| 2,443,577 | 6/1948 | Finlay .......................... 29/500 X |
| 2,926,421 | 3/1960 | Sandberg ....................... 29/501 |
| 3,057,057 | 10/1962 | Langhans ..................... 29/500 X |
| 3,140,538 | 7/1964 | Rutledge ....................... 29/501 |
| 3,678,558 | 7/1972 | Fredericks .................... 29/471.1 |

Primary Examiner—Al Lawrence Smith
Assistant Examiner—K. J. Ramsey
Attorney, Agent, or Firm—Stevens, Davis, Miller & Mosher

[57] ABSTRACT

In a fabricating process of a metallic honeycomb structure, a plurality of bar soldering materials are laid on a plurality of metallic structure members previously assembled as a honeycomb structure and melted in a heating kiln to complete the soldering joint.

9 Claims, 6 Drawing Figures

MANUFACTURING METHOD OF METALLIC HONEYCOMB STRUCTURES

BACKGROUND OF THE INVENTION

The present invention relates to a method for fabricating a metallic honeycomb structure, and more particularly to a unique manufacturing method of an iron or iron alloy honeycomb structure.

Prior arts have disclosed such a method for manufacturing a honeycomb structure made of iron or iron alloy as to first arrange structure members pressed to have waveshaped cross-sections to engage the jointing portions thereof longitudinally to one another and to secondarily clamp the arranged structure members in their positions by a clamping frame set and soak into a soldering bath filled with molten solder or silver solder to complete the honeycomb structure. Another way may be to weld the jointing portions of the structure members engaging to one another.

The former conventional method has such demerits as to be very costly for equipping the soldering bath, to cause the whole honeycomb structure to have remains of solder or silver-solder thereon and/or to result in ununiform soldering of the jointing portions. The latter conventional method has, too, such demerits as to require a long process hours for many welding portions and/or to be unsuitable to fabricate honeycomb structures in small sizes.

SUMMARY OF THE INVENTION

The prime object of the present invention is, therefore, to provide such a fabricating method of a metallic honeycomb structure as to solve the above-discussed demerits in the conventional methods, wherein soldering materials are laid on metallic structure members previously arranged and clamped in position and the soldering joint is completed in a heating kiln.

According to the present invention, there is provided with a manufacturing method of a metallic honeycomb structure which comprises the steps of pressing a metallic band member in a wave-shape along the longitudinal direction thereof; assembling a plurality of the pressed band members as a honeycomb structure by engaging the waved portions of one pressed band member with the corresponding waved portions of another pressed band member; clamping the band members in their assembled positions in such a way to leave clearances for capillary effect between the engaged portions of the band members; washing the clamped honeycomb structure members after the clamping process; laying a plurality of bar soldering materials on the engaged portions in parallel to one another; and melting the bar soldering materials in a heating kiln filled with reducing or inert gas to uniformly saturate the molten soldering materials into the clearances and subsequently chilling the band members to complete the soldering joint of the engaged portions of the band members.

BRIEF DESCRIPTION OF THE DRAWINGS

These and further objects, features and advantages of the present invention will become more apparent when reading the following detailed description of the invention by reference to the accompanying drawings illustrative of several preferred embodiment of the invention.

DESCRIPTION OF THE PREFERRED EMBODIMENT

Figure 1:
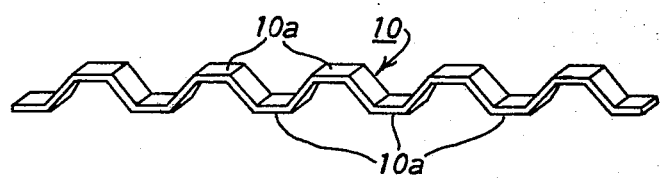
FIG. 1 is a perspective view of a structure member for a metallic honeycomb structure in accordance with the present invention.

Referring now to the drawings, particularly to FIG. 1, there is disclosed a preferred embodiment of the present invention. A structure member 10 is a rolled steel band having substantially a 0.5mm thickness. The rolled steel band 10 is pressed to have a wave-shaped cross-section. Top flats 10a of a width and height are alternatively formed upwardly and downwardly to be solder-jointing portions.

Figure 2:
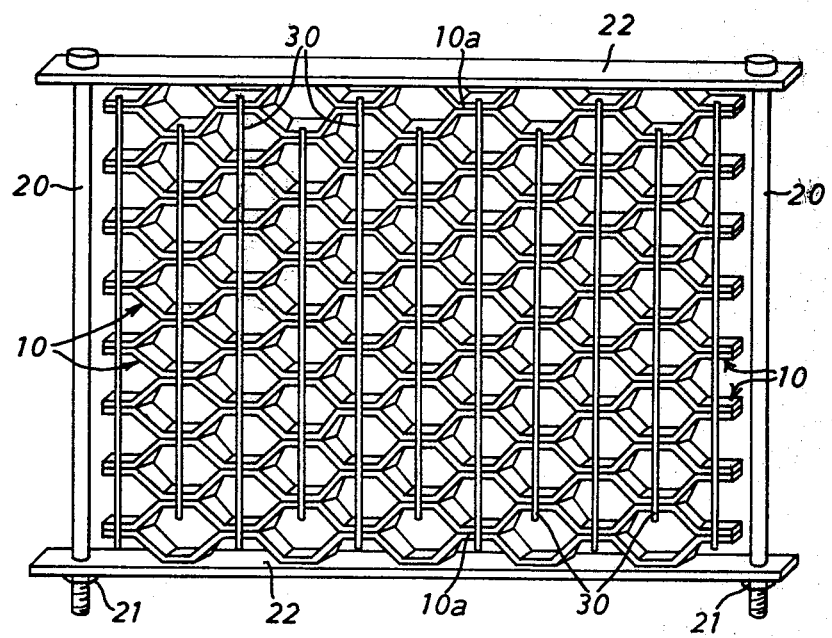
FIG. 2 is a perspective view wherein a plurality of the structure members of FIG. 1 are arranged in a honeycomb shape and clamped by a clamping frame set and bar soldering materials are laid on the arranged and clamped structure members.

As best illustrated in FIG. 2, a plurality of the structure members 10 are arranged horizontally to loosely engage the solder-jointing flats 10a of one structure member 10 with the solder-jointing flats 10a of another structure member 10. The arranged structure members 10 are clamped in their positions by clamping frames 22 which are fixedly assembled by bolts 20 and nuts 21 at the both ends thereof in such a way to leave clearance less than 0.5mm between each of the two solder-jointing flats 10a facing to each other.

The arranged and clamped structure members 10 are washed with cleanser such as trichloroethylene and the like. Then, pure copper soldering bars 30 of a 1.2mm diameter are laid on the solder-jointing flats 10a in parallel to one another.

Figure 3:
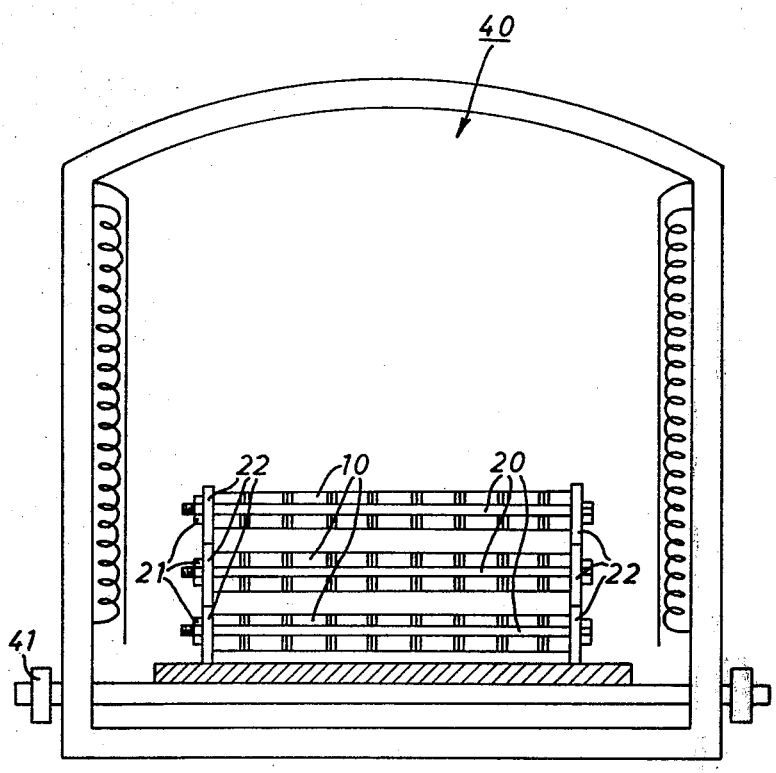
FIG. 3 shows the soldering process of the arranged and clamped structure members within a heating room of an electric kiln.

As seen in FIG. 3, the arranged and clamped structure members 10 having the soldering bars 30 laid thereon are piled in plural layers (in three layers in this embodiment). The pile of the structure members 10 are transfered into the heating room of an electric kiln 40 by a belt-conveyer 41. The temperature in the heating room of the electric kiln 40 is maintained at 1,100°C which is over the melting point of the pure copper soldering bars 30. The heating room of the electric kiln 40 is protectively filled with reducing gas such as ammonia cracked gas or inert gas to prevent the steel band structure members 10 from oxidation and to fully effect soldering.

The structure members 10 and the soldering bars 30 are heated for twenty minutes and the clearances between the jointing flats 10a are saturated fully and uniformly with molten pure copper solder by way of capillary effect. Thus, the soldering is completed. The soldered honeycomb structure is chilled in the protective atmosphere of ammonia cracked gas.

In the above-disclosed embodiment, pure copper soldering bars 30 of a 1.2mm diameter are used as a preferred soldering material, but copper or copper alloy soldering bars of different diameters or of proper cross-section may be used. Furthermore, it may be rather practical to select an angular soldering bar which would not easily be displaced for better positioning thereof on the jointing flats 10a. The diameter or thickness of the soldering bars 30 should be decided to fully saturate whole the jointing flats 10a.

Figure 4:
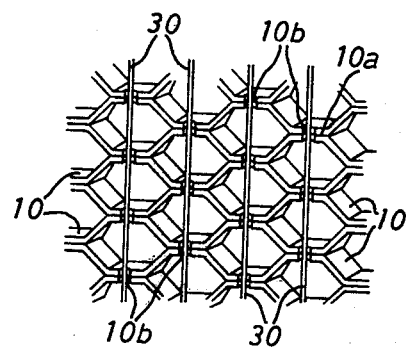
FIGS. 4 to 6, inclusive, show perspective partial views of modifications of FIG. 2.
Figure 5:
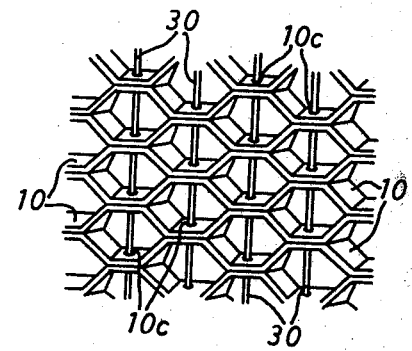
Figure 6:
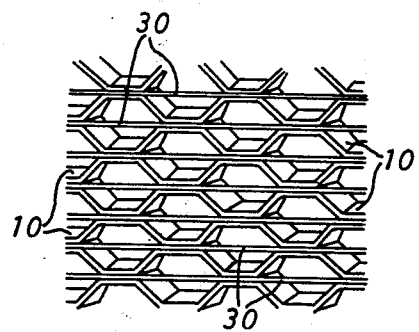

FIGS. 4, 5 and 6 disclose modifications of the above-disclosed preferred embodiment. In the modifications the same reference numerals designate the same parts of the previous embodiment, and no repetition is made on the same assembling works and soldering process.

In FIG. 4, the structure members 10 are provided with a recess 10b on a side of each jointing flat 10a. The recesses 10b will hold easily the soldering bars 30 in their positions. In FIG. 5, the structure members 10 are provided with through holes 10c on the jointing flats 10a to have the soldering bars 30 therethrough. FIG. 6 discloses another way to hold the soldering bars 30 in their positions, wherein the bars 30 are parallely arranged along the jointing flats 10a.

In practically embodying the present invention, the temperature in the heating room of the electric kiln 40 is preferably maintained at a value over the melting point of the soldering bars 30 by 5° to 30°C for best soldering effect. In case, the heating room temperature is less than the one over the soldering bar melting point by 5°C, only poor liquidity of the melted soldering bars 30 is caused for a poor soldering effect. On the contrary, even in case the heating room temperature is more than the one over the soldering bar melting point by 30°C, the soldering effect may not be increased and what is worse, the iron or iron alloy honeycomb structure members 10 may be weakened in hardness and the soldering strength may be weakened.

As well explained in the above, the present invention is characterized in that the iron or iron alloy band structure members are pressed in a wave-shape along the longitudinal direction thereof and arranged to form a honeycomb structure, laid on the assembled structure members are the copper or copper alloy soldering materials which have good soldering feature to iron or iron alloy, the soldering materials are melted in the heating room of the electric kiln under the protective atmosphere by the reducing or inert gas, and the melted soldering materials saturate between the jointing portions of the structure members to complete the soldering of the structure members to one another. Consequently, an iron or iron alloy honeycomb structure can be fabricated with the jointing portions soldered uniformly and strongly. A good selection of a diameter or thickness for the soldering materials enables saturation of the materials fully but not exceedingly on the jointing flats of the structure members, thereby to require no additional finishing work to realize a low production cost of the honeycomb structure.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. A manufacturing method of a metallic honeycomb structure comprising the steps of pressing a metallic band member in a wave-shape along the longitudinal direction thereof;

assembling a plurality of said pressed band members as a honeycomb structure by engaging the waved portions of one pressed band member with the corresponding waved portions of another pressed band member; each of said pressed band members having a recess at one side of each waved portion thereof;

clamping said band members in their assembled position in such a way to leave clearances for capillary effect between the engaged portions of said band members;

washing the clamped honeycomb structure members after said clamping process;

laying a plurality of bar soldering materials in the recesses of the engaged portions of said band members parallel to one another; and melting said bar soldering materials in a heating kiln filled with reducing or inert gas to uniformly saturate said molten soldering materials into the clearances between the engaged portions of said band members and subsequently chilling said band members to complete the soldering joint of the engaged portions of said band members.

2. A manufacturing method of a metallic honeycomb structure comprising the steps of pressing a metallic band member in a wave-shape along the longitudinal direction thereof;

assembling a plurality of said pressed band members as a honeycomb structure by engaging the waved portions of one pressed band member with the corresponding waved portions of another pressed band member; each of said pressed band members having a through hole on each waved portion thereof;

clamping said band members in their assembled position in such a way to leave clearances for capillary effect between the engaged portions of said band members;

washing the clamped honeycomb structure members after said clamping process;

laying a plurality of bar soldering materials on the engaged portions of said band members parallel to one another by passing said bar soldering materials through said holes; and melting said bar soldering materials in a heating kiln filled with reducing or inert gas to uniformly saturate said molten soldering materials into the clearances between the engaged portions of said band members and subsequently chilling said band members to complete the soldering joint of the engaged portions of said band members.

3. A manufacturing method of a metallic honeycomb structure comprising the steps of pressing a metallic band member in a wave-shape along the longitudinal direction thereof;

assembling a plurality of said pressed band members as a honeycomb structure by engaging the waved portions of one pressed band member with the corresponding waved portions of another pressed band member;

clamping said band members in their assembled position in such a way to leave clearances for capillary effect between the engaged portions of said band members;

washing the clamped honeycomb structure members after said clamping process;

laying a plurality of bar soldering materials parallel to one another over and along engaged portions of said band members longitudinally of said band members wherein said bars are of such length and positioned so as to extend between at least two said spaced engaged portions of the honeycomb structure; and melting said bar soldering materials in a heating kiln filled with reducing or inert gas to uniformly saturate said molten soldering materials into the clearances between the engaged portions of said band members and subsequently chilling said band members to complete the soldering joint of the engaged portions of said band members.

4. A manufacturing method of a metallic honeycomb structure as set forth in claim 1, wherein an iron or iron alloy band member is used as said metallic band member and copper or copper alloy soldering material is used as said bar soldering material.

5. A manufacturing method of a metallic honeycomb structure as set forth in claim 1, wherein the heating temperature of said kiln is maintain at a value over the melting point of said soldering materials by 5° to 30°C.

6. A manufacturing method of a metallic honeycomb structure as set forth in claim 1, wherein an iron or iron alloy band member is used as said metallic band member and copper or copper alloy soldering material is used as said bar soldering material.

7. A manufacturing method of a metallic honeycomb structure as set forth in claim 2, wherein the heating temperature of said kiln is maintained at a value over the melting point of said soldering materials by 5° to 30°C.

8. A manufacturing method of a metallic honeycomb structure as set forth in claim 3, wherein an iron or iron alloy band member is used as said metallic band member and copper or copper alloy soldering material is used as said bar soldering material.

9. A manufacturing method of a metallic honeycomb structure as set forth in claim 3, wherein the heating temperature of said kiln is maintained at a value over the melting point of said soldering materials by 5° to 30°C.

* * * * *